3,029,201
WATER TREATMENT

Kenneth M. Brown, Hinsdale, William K. T. Gleim, Island Lake, and Peter Urban, Northbrook, Ill., assignors to Universal Oil Products Company, Des Plaines, Ill., a corporation of Delaware
No Drawing. Filed Dec. 28, 1959, Ser. No. 862,059
9 Claims. (Cl. 210—59)

This invention relates to the treatment of water and more particularly to a novel method of treating water containing sulfur impurities.

In various industrial applications, water containing sulfur impurities is collected prior to disposal. For example, in a petroleum refinery, large quantities of water are used in refining operations such as purifying hydrocarbon fractions, steam distillation, heat transfer, diluting corrosive materials, etc. When used as a purifying medium, the water becomes contaminated with the impurities removed from the petroleum. When used otherwise in contact with petroleum, the water will contain at least an equilibrium distribution of the impurities contained in the petroleum. The more abundant of these impurities are hydrogen sulfide and ammonia, although other impurities are present as, for example, aliphatic mercaptans, thiophenols, phenols, etc. With the increase in the size of refineries and in the number of processing steps in a refining operation, the amount of impurities in the water is increased to an extent that may be harmful to marine life when the waste water is disposed of in the neighboring streams.

The impurities in waste water from petroleum refineries include ammonium sulfide, sodium sulfide, potassium sulfide, and in some cases hydrogen sulfide, as well as mercaptans, phenols, etc. Although these impurities comprise a minute portion of a large volume of water, the sulfides, for example, consume oxygen when disposed in neighboring streams and rob aquatic life of necessary oxygen. In accordance with the present invention, the waste water is treated in a novel manner to convert the sulfide impurities to a form having an oxygen demand which is considerably reduced and in some cases is practically nil.

While the novel features of the present invention are particularly applicable to the treatment of waste water from a petroleum refinery, it is understood that the invention also is used for the treatment of waste water from any industrial operations releasing water containing sulfur impurities. Such waste water may be released from chemical plants, manufacturing plants, sewerage treatment, etc. Furthermore, while the present invention has particular application in treating waste water prior to disposal, it is understood that the novel process of the present invention serves to improve waste water so that, in some cases, it may be reused within the process. In still other applications, the present invention may be used to treat well water or water from other sources which contain hydrogen sulfide or other sulfur impurities.

As hereinbefore set forth, the sulfur impurities comprise a small proportion of the waste water. The sulfur impurities comprise less than 5% and generally less than 2% by weight of the water. In these small concentrations, the sulfur impurities are converted in accordance with the present invention in order to benefit the water so that it may be disposed of. Accordingly, it is an essential feature of the present invention that the water being treated in accordance with the present invention contain the sulfide impurities in a concentration of less than 5% and generally less than 2% by weight of the water.

In one embodiment the present invention relates to a method of treating water containing a sulfur impurity in a concentraiton of less than 5% by weight of said water, which comprises reacting said sulfur impurity with an oxidizing agent in the presence of a phthalocyanine catalyst.

In a specific embodiment the present invention relates to a method of treating waste water containing ammonium sulfide in a concentration of less than 2% by weight of said water, which comprises reacting said ammonium sulfide with air in the presence of cobalt phthalocyanine sulfonate.

As described above, water containing a sulfur impurity is reacted with an oxidizing agent in the presence of a phthalocyanine catalyst. This serves to convert ammonium sulfide, sodium sulfide, potassium sulfide, and hydrogen sulfide, when present, to the corresponding thiosulfates and in part to the sulfates. It will be noted that the thiosulfates and sulfates are in a highly oxidized state and thus will not have an oxygen demand, in contrast to the high oxygen demand of the sulfides. When present, mercaptans, phenols, etc. also are converted to an oxidized state and accordingly have a reduced oxygen demand.

Any suitable phthalocyanine catalyst may be used in the present invention and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, etc. The metal phthalocyanine, in general, is not readily soluble in aqueous solvents and, for ease in compositing with a solid carrier, a derivative of the phthalocyanine is preferred. A particularly preferred derivative is the sulfonated derivative. Thus, an especially preferred phthalocyanine catalyst is cobalt phthalocyanine sulfonate. Such a catalyst is available commercially and comprises cobalt phthalocyanine disulfonate and also contains cobalt phthalocyanine monosulfonate. Another preferred catalyst comprises vanadium phthalocyanine sulfonate. These compounds may be obtained from any suitable source or may be prepared in any suitable manner as, for example, by reacting cobalt or vanadium phthalocyanine with 25–50% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

In a preferred embodiment, the phthalocyanine catalyst is used in association with a solid carrier. In some cases, the carrier also may exert a catalytic effect and, in other cases, the carrier may serve merely as a means of dispersing the active component and to extend the available surface. Any suitable carrier may be employed. Activated carbon and particularly charcoal are preferred carriers. Illustrative charcoals include bone char, wood charcoal, charcoal made from coconut or other nut shells, fruit pits, etc. Other carriers include coke, silica, alumina, silica-alumina composites, etc., which may be either synthetically prepared or naturally occurring, the latter usually being activated by acid, heat or other treatment. The phthalocyanine catalyst is composited with the carrier in any suitable manner such as by dipping, suspending, immersing, etc. particles of the solid carrier in a solution containing the phthalocyanine catalyst, or the solution may be sprayed, poured or otherwise contacted with the carrier. Any suitable solvent may be used in preparing the solution of phthalocyanine catalsyt and preferably comprises water containing at least a trace of an alkaline material including sodium hydroxide, potassium hydroxide, ammonium hydroxide, lithium hydroxide, rubidium hydroxide, cesium hydroxide, etc. In another embodiment the solvent comprises an alcohol and particularly methanol. Other solvents include ethanol propanol, butanol, etc., acetone, methyl ethyl ketone, etc., dimethyl ether, diethyl ether, etc. It is understood that the carrier may be formed into particles of uniform or irregular size and shape including spheres, pills, pellets, rings, saddles, flakes, etc., either after but preferably prior to compositing with the phthalocyanine catalyst.

In general it is preferred to composite as much catalyst with the carrier as will form a stable composite, although a lesser amount may be so deposited, if desired. In one preparation, 1% by weight of cobalt phthalocyanine sulfonate catalyst was composited with activated carbon by soaking granules of the carbon in a solution of the phthalocyanine catalyst. In another method, the carrier may be deposited in the treating zone and the phthalocyanine catalyst solution passed therethrough in order to form the catalyst composite in situ. If desired, the solution may be recycled one or more times in order to prepare the desired composite. In still another embodiment the carrier may be deposited in the treating chamber and the chamber filled with a solution of the catalyst, thereby forming the composite in situ.

Any suitable oxidizing agent may be employed. Air is particularly preferred, although oxygen or other oxygen-containing compounds may be employed. In some cases the water may contain entrained air or oxygen in a sufficient concentration to accomplish the desired oxidation, but it generally is preferred to commingle additional air with the water prior to or during the treatment of the water.

In one embodiment, the composite of catalyst and carrier is disposed as a fixed bed in a treating zone, and the waste water, alone or together with air, is passed into contact with the catalyst, in either upward or downward flow. When desired, the air may be commingled with the water and passed in this manner into the treating zone or the air may be introduced directly into the treating zone and passed either concurrently or countercurrently to the water stream. In another embodiment the water is treated with a slurry of the solid catalyst composite in water, with intimate mixing in any suitable manner, after which the catalyst is separated from the treated water and preferably is reused for the treatment of further quantities of waste water. Separation of the catalyst from the water may be effected in any suitable manner such as by settling, conventional filtration, etc.

Generally it is preferred to utilize the phthalocyanine catalyst as a solid composite with a carrier, in order to effect separation of catalyst from water. However, in some cases, it may be satisfactory to utilize the catalyst directly in solution in the water or as a solution in an alkaline agent, including sodium hydroxide, ammonium hydroxide, potassium hydroxide, lithium hydroxide, etc., and to intimately mix the catalyst and water, along with air or other oxidizing agent, to effect oxidation of the sulfides contained in the water. In this embodiment the catalyst is allowed to remain in the water and to be disposed therewith. However, the amount of catalyst utilized in this method is very small and may range from less than 5 to 100 parts per million or more of the water.

Treatment of the water with the catalyst generally is effected at ambient temperature, although in some cases elevated temperatures may be utilized but usually will not exceed about 200° F. Superatmospheric pressure is not required but the pressure should be sufficient to maintain flow of the water through the catalyst bed and thus may range from 5 to 50 p.s.i.g., although higher pressures may be employed, if desired. Also, it is understood that a higher temperature, which may range up to 400°–500° F., and either with low pressure or, when desired, high pressure to maintain substantially liquid phase, may be employed when advantages appear therefor. The amount of air or other oxidizing agent is sufficient to react with the sulfur impurities in the water, although an excess of air generally is used to insure substantially complete reaction of the sulfur impurities.

Following the treatment in the manner hereinbefore described, the waste water is now substantially reduced in sulfides and may be disposed of into neighboring streams. The treated water will have a low or practically no oxygen demand due to sulfur compounds and therefore will not rob aquatic life of the necessary oxygen. As hereinbefore set forth, in some cases it may be desired to reuse within the process the water treated in the above manner. The treated water either may be used as such or, if desired, may be given any additional treatment to further improve it for such reuse.

The particular method of accumulating water will depend upon the specific situs at which the water is available. For example, in a petroleum refinery, water is used in numerous places in the refinery and the waste water generally is collected in one or several places in the refinery. Water is used to strip hydrocarbons from catalysts in a catalytic cracking operation. Water also is used to dilute the effluent products from a reactor of a reforming process employed to treat gasoline to increase the anti-knock characteristics thereof. Water also is used in a refinery to dilute overhead vaporous products from fractionators. Aqueous solutions of sodium hydroxide or potassium hydroxide are used to treat hydrocarbon streams containing hydrogen sulfide and the water from such treatment contains sodium or potassium sulfides. The different waste water streams generally are collected in one or more zones, and the waste water so collected then is treated in the manner heretofore described to convert the sulfur impurities. In some cases the waste water may first be stripped with light hydrocarbon gases or flue gases to remove volatile impurities therefrom and the stripped waste water then is treated in the manner herein described. In any event, the sulfur impurities comprise less than 5% and generally less than 2% by weight of the water.

The following examples are introduced to illustrate further the novelty and utility of the present invention but not with the intention of unduly limiting the same.

*Example I*

A composite of cobalt phthalocyanine sulfonate on activated carbon was prepared by dissolving cobalt phthalocyanine sulfonate in water to which a trace of ammonium hydroxide (28%) solution was added. Activated carbon granules of 30 to 40 mesh were added to the solution with stirring. The mixture was allowed to stand overnight and then was filtered to separate excess water. The catalyst then was dried and was calculated to contain 1% by weight of the phthalocyanine catalyst.

10 cc. of the composite catalyst prepared in the above manner were mixed in a separatory funnel with 100 ml. of water containing 0.0112% by weight of ammonium sulfide. The mixture was shaken at room temperature and analyzed periodically by titration with silver nitrate to determine the disappearance of the sulfide ions. The air contained in the separatory funnel was sufficient for the desired purpose.

After 13 minutes of contact in the above manner, the sulfide concentration was reduced to 0.00032% by weight.

From the above data, it will be seen that the ammonium sulfide was reduced from 0.0112% by weight to 0.00032% by weight within 13 minutes.

*Example II*

Another water solution was prepared to contain 0.0112% by weight of ammonium sulfide and 0.0029% by weight of thiophenol, a total of 0.0141% by weight of sulfur compounds. This run was made to determine whether both ammonium sulfide and thiophenol in admixture could be reacted in the method of the present invention. After 15 minutes of contact in the manner described in Example I, the sulfide and thiophenol were reduced to 0.0016% by weight, thus showing a substantial reduction of both the ammonium sulfide and thiophenol.

Example III

In order to show the beneficial effect obtained when using the catalyst, a run similar to that described in Example I was made, except that the phthalocyanine catalyst was omitted. After 15 minutes of contact the ammonium sulfide was reduced from 0.0112% by weight to 0.0097% by weight, a reduction of only 0.0015% by weight. It will be noted that this is in contrast to a reduction of 0.01088% by weight obtained in the presence of the catalyst.

Another sample of the solution described in Example II was left exposed to the atmosphere for 96 hours at room temperature to determine the stability of the solution. After 96 hours the ammonium sulfide concentration was reduced from 0.0112% by weight to 0.0084% by weight, a reduction of only 0.0028% by weight. The concentration of thiophenol remained unchanged during this period.

Example IV

Water withdrawn from a receiver, to which the overhead products of a distillation column of a catalytic cracking unit are passed, contains approximately 2900 parts per million of ammonium sulfide, analyzed separately as ammonia and as sulfide. Fresh and/or recycled water is introduced into the reactor to strip entrained catalyst from the hydrocarbons, and the water is later collected in the receiver mentioned above.

The water collected in the receiver as described above is passed at ambient temperature, together with air, downwardly through a treating zone containing a fixed bed of the composite catalyst prepared in the manner described in Example I. This serves to reduce the ammonium sulfide concentration of the water sufficiently low to permit disposal of the water into a neighboring stream.

Example V

Water is used in a refinery to dilute the reactor effluent products of a high temperature purification unit. In this unit gasoline containing mercaptans and nitrogen compounds is subjected to conversion at a temperature of 750° F. and a pressure of 500 p.s.i.g. in contact with a catalyst comprising alumina-molybdenum sulfide-cobalt sulfide. This treatment converts the sulfur compounds to hydrogen sulfide and the nitrogen compounds to ammonia. Upon cooling of the heated products ammonium sulfide is formed, and water is commingled with the effluent products in order to dissolve the ammonium sulfide in the water and to thereby remove it from the hydrocarbons.

Water also is used in a catalytic reforming process. In this process, gasoline is subjected to reforming at a temperature of 900° F. and a pressure of 500 p.s.i.g. in contact with a catalyst comprising alumina-platinum-combined halogen. The effluent products from the reactor are sent to a separator wherein gases are separated from liquid products. The liquid products then are fractionated to separate lower boiling components. Water is commingled with the overhead stream from the fractionator to dissolve ammonium sulfide and other impurities.

The water recovered from the above operations is collected and passed, together with air, into contact with a catalyst comprising vanadium phthalocyanine sulfonate composited with activated charcoal. The treatment is effected at ambient temperature and at a pressure of 25 p.s.i.g. The water treated in the above manner is reduced in ammonium sulfide concentration from approximately 3,000 parts per million down to less than 50 parts per million. It will be seen that the treated water will have an oxygen demand considerably less than the untreated water.

Example VI

Straight run gasoline containing hydrogen sulfide is prewashed with a 10° Baumé sodium hydroxide aqueous solution to remove the hydrogen sulfide from the gasoline. The hydrogen sulfide reacts with the sodium hydroxide to form sodium sulfide. After the sodium hydroxide solution becomes spent (either to a point where all the sodium hydroxide is converted to sodium sulfide or where it is impractical to continue using the sodium hydroxide solution) the spent sodium hydroxide solution then is commingled with other waste water at the refinery. Generally, the spent sodium hydroxide solution will be commingled with at least 25 and preferably at least 50 volumes of waste water per volume of spent sodium hydroxide solution. The commingled water then is treated in the manner described in Example I to convert the sodium sulfide and other sulfides prior to disposal of the water in a neighboring stream.

Example VII

In another operation similar to that described in Example VI, potassium hydroxide solution is used instead of the sodium hydroxide solution. The use of potassium hydroxide to treat gasoline containing hydrogen sulfide results in the formation of potassium sulfide. The spent potassium hydroxide solution is commingled with a large volume of other waste water resulting in a sulfide concentration of 0.1% by weight. The water then is treated by being passed with air downwardly through a fixed bed of cobalt phthalocyanine carboxylate composited with charcoal. Following this treatment, the water may be disposed of in a neighboring stream.

Example VIII

Well water containing hydrogen sulfide is treated by being passed with air downwardly through a fixed bed of vanadium phthalocyanine carboxylate composited with alumina. This treatment serves to oxidize the hydrogen sulfide and to remove the obnoxious odor of the water.

We claim as our invention:

1. A method of treating water containing an inorganic sulfide impurity in a concentration of less than 5% by weight of said water, which comprises reacting said sulfide impurity with an oxidizing agent in the presence of a phthalocyanine catalyst.

2. A method of treating water containing an alkali metal sulfide impurity in a concentration of less than 5% by weight of said water, which comprises reacting said sulfide impurity with an oxidizing agent in the presence of a metal phthalocyanine catalyst.

3. A method of treating water containing an inorganic sulfide impurity in a concentration of less than 2% by weight of said water, which comprises reacting said impurity with air in the presence of a composite of metal phthalocyanine sulfonate and solid carrier.

4. A method of treating water containing an inorganic sulfide impurity in a concentration of less than 2% by weight of said water, which comprises reacting said impurity with air in the presence of a composite of metal phthalocyanine carboxylate and solid carrier.

5. A method of treating waste water containing an inorganic sulfide impurity in a concentration of less than 2% by weight of said water, which comprises reacting said sulfide impurity with air in the presence of a composite of cobalt phthalocyanine sulfonate and carbon carrier.

6. A method of treating waste water containing an inorganic sulfide impurity in a concentration of less than 2% by weight of said water, which comprises reacting said sulfide impurity with air in the presence of a composite of cobalt phthalocyanine carboxylate and carbon carrier.

7. A method of treating waste water containing an inorganic sulfide impurity in a concentration of less than 2% by weight of said water, which comprises reacting said sulfide impurity with air in the presence of a composite of vanadium phthalocyanine sulfonate and carbon carrier.

8. A method of treating waste water containing an inorganic sulfide impurity in a concentration of less than 2% by weight of said water, which comprises reacting said sulfide impurity with air in the presence of a composite of vanadium phthalocyanine carboxylate and carbon carrier.

9. A method of treating waste water from a petroleum refining operation, said water containing inorganic sulfide impurities in a concentration of less than 2% by weight of said water, which comprises reacting said sulfide impurities with air in the presence of a cobalt phthalocyanine sulfonate catalyst composited with activated carbon.

References Cited in the file of this patent
UNITED STATES PATENTS
2,882,224    Gleim et al. _____ Apr. 4, 1959

OTHER REFERENCES

Berkman et al.: "Catalysis," published by Reinhold Publishing Co., New York (1940), pages 456–458 relied upon.